United States Patent
Schaus

[15] 3,659,448
[45] May 2, 1972

[54] GAS METER DIAPHRAGM HAVING INTERMEDIATE STABILIZING AND TENSIONING RING

[72] Inventor: Karl L. Schaus, 224 East 6th Street, Tempe, Ariz. 85281

[22] Filed: July 22, 1970

[21] Appl. No.: 57,141

[52] U.S. Cl. ................................. 73/279, 92/100
[51] Int. Cl. .......................... G01f 15/16, F16i 3/00
[58] Field of Search ................... 73/262–71, 278–80; 92/98–102, 417, 418

[56] References Cited

UNITED STATES PATENTS 2,809,521  10/1957  Waddell ................................. 73/280
3,340,734  9/1967  St. Clair ................................ 73/279

Primary Examiner—Richard C. Queisser
Assistant Examiner—C. E. Snee, III
Attorney—William S. Rambo

[57] ABSTRACT

A gas meter diaphragm characterized by a rigid tensioning and stabilizing ring secured to the flexible diaphragm body intermediate a rigid, outer mounting rim and a centrally disposed rigid center pan for the purpose of eliminating wrinkles in the flexing portion of the diaphragm, and providing an intermediate, slightly yieldable, annular area of flexible material under tension around the center pan portion of the diaphragm assembly. The diaphragm being further characterized by a comparatively lighter weight, self-supporting central portion which eliminates the need for the usual carrier wire assembly employed to movably support the center pan portion of prior art diaphragms.

1 Claims, 3 Drawing Figures

INVENTOR.
KARL L. SCHAUS
BY
W.S.Rancho
ATTORNEY

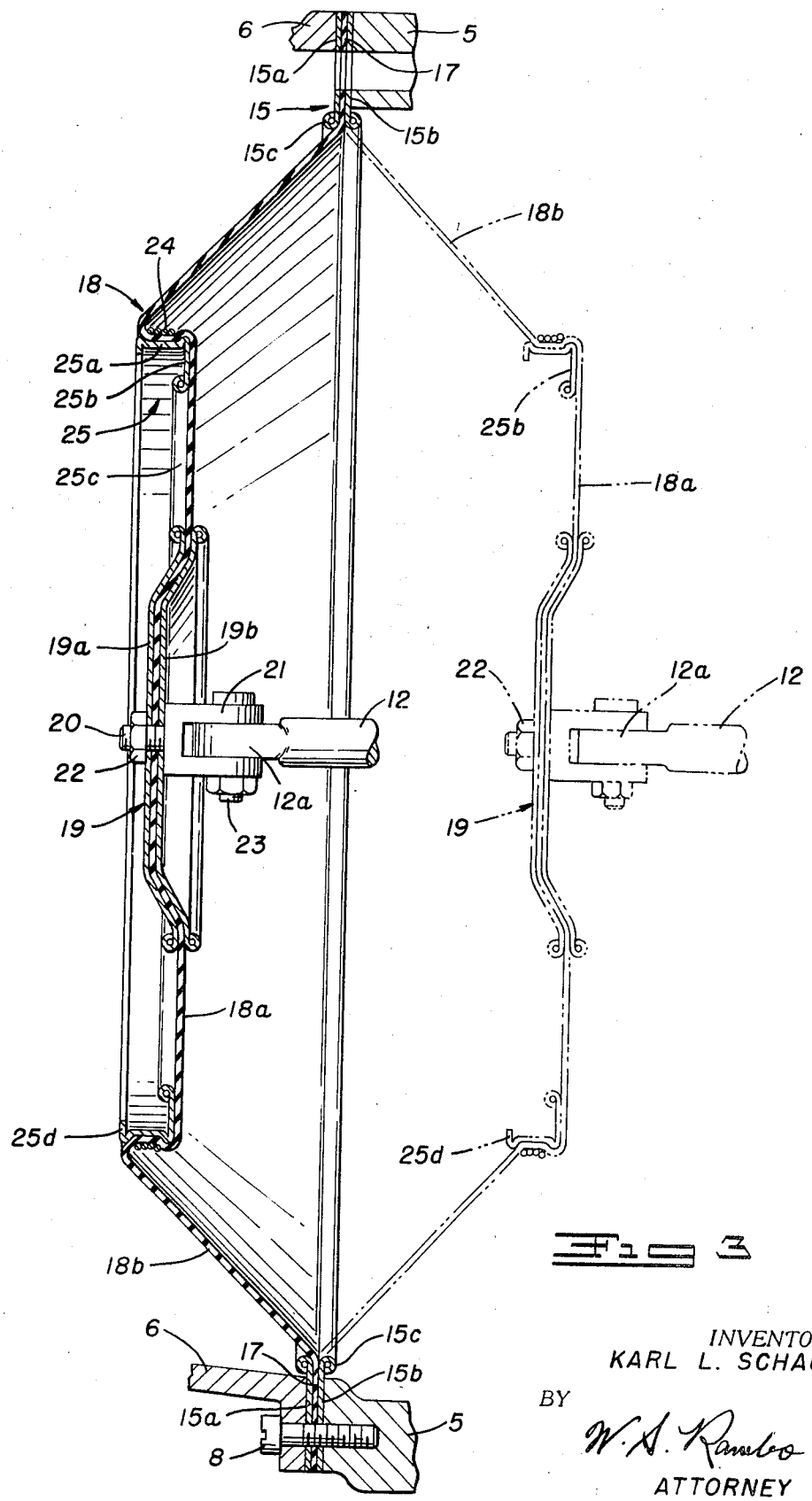

3,659,448

GAS METER DIAPHRAGM HAVING INTERMEDIATE STABILIZING AND TENSIONING RING

BACKGROUND OF THE INVENTION:

This invention relates generally to gas meter diaphragms, and more particularly to an improved diaphragm assembly for use in the standard-type three chamber gas meter which is commonly employed to indicate and record the volumetric flow of fuel gases to a residential or commercial building.

In the past, gas meter diaphragms have generally included an annular, outer mounting rim or flange of sheet metal bolted or otherwise secured to the gas meter casing, an intermediate, annular, flexible diaphragm body of leather or rubber arranged to flex back and forth within the meter casing in response to differentials in gas pressures on opposite sides of the diaphragm body, and a sheet metal center pan secured to and movable with the flexible diaphragm body and connected with the lower main movement (crank mechanism) of the meter. Due to the billow and flexibility of the diaphragm body and the weight of the sheet metal center pan portion of the diaphragm assembly, it was usually necessary to employ one or more pivotally mounted carrier wires to support the center pan portion of the diaphragm assembly during its reciprocating pulsing movement and thereby insure uniform and smooth reciprocating movement of the diaphragm body, and decrease the bending moment and friction which would otherwise be imposed on the lower main movement of the gas meter recording mechanism by an unsupported center pan portion. However, as is well known to those familiar with the design and servicing of gas meters, the primary difficulties experienced with prior art diaphragm assemblies stem from the presence of wrinkles, puckers, or "crows feet" in the areas of the flexible diaphragm body where it is joined with the outer mounting rim and with the center pan portion of the diaphragm assembly and from the added frictional forces imposed by the presence of a carrier wire attached to the center pan portion of the diaphragm assembly. Both of these factors result in inaccuracies in the recording function of the gas meter and undesirable wear on the relatively delicate moving parts of the meter.

SUMMARY AND OBJECTS OF THE INVENTION:

The primary object of this invention is to eliminate or greatly reduce the aforesaid difficulties attendant to prior art gas meter diaphragms by providing an improved diaphragm assembly characterized by a comparatively light weight, self-supporting center pan portion and a flexible diaphragm body portion which is substantially free of wrinkles, puckers, or "crows feet". Another object is to provide a diaphragm assembly which eliminates the need for a carrier wire and its attendant fittings, thereby reducing costs and frictional forces which would otherwise be imposed by the presence of such carrier wire and fittings.

According to the present invention, the diaphragm assembly comprises a substantially rigid, outer mounting rim in which the outer marginal edge portion of a molded, generally shallow, dome or bowl-shaped flexible diaphragm sheet or body is secured, a relatively small, lightweight, but rigid center pan secured to the central portion of the flexible diaphragm body, and a rigid, stabilizing and tensioning ring secured to the intermediate portion of the flexible diaphragm body in spaced relation to both the outer mounting rim and the center pan and arranged to hold the area of the flexible diaphragm body lying between the center pan and stabilizer ring under slight resilient tension and in a substantially flat or planar configuration.

BRIEF DESCRIPTION OF THE DRAWINGS:

A further and more detailed understanding of this invention may be had by reference to the following description and the accompanying drawings, wherein:

FIG. 3 is a further enlarged, medial vertical cross-sectional view taken through the diaphragm assembly and adjoining parts of the gas meter.

Figure 1:
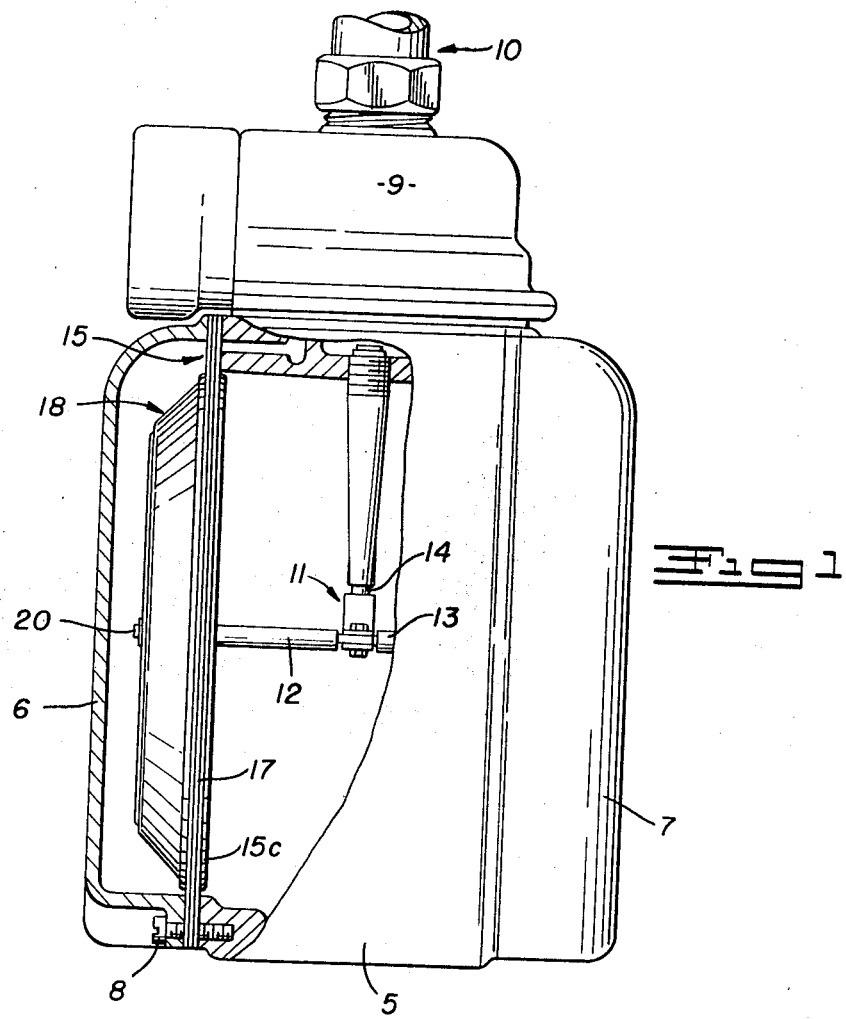
FIG. 1 is a side elevational view, partially in vertical section, of a gas meter incorporating a diaphragm assembly according to this invention.

DESCRIPTION OF PREFERRED EMBODIMENT:

Referring now to the drawings, and particularly FIG. 1 thereof, the reference numeral 5 designates generally the central outer casing of a conventional three chamber gas meter. The outer casing 5 also includes the usual end covers 6 and 7 which are removably secured to the central portion of casing such as by bolts 8. The meter also includes an upper valve and indicator housing 9 and pipe fitting 10. Positioned within the meter casing 5 is the lower main movement or lower crank assembly 11 and its associated connecting rods or links 12 and 13 through which the reciprocating pulsing movement of a pair of diaphragms is translated into rotary movement of an index drive shaft 14. It will here be understood that the above described mechanism and parts are common to standard and conventional three chamber gas meters, and as such, form no part of the present invention.

The present invention resides in the particular construction of the diaphragm assemblies employed in such gas meters, as will be hereinafter more fully described. Also, while the gas meter normally utilizes two opposed diaphragm assemblies which are identical in construction and function, only one such diaphragm assembly is shown in the drawings for purposes of simplification and abbreviation.

Figure 2:
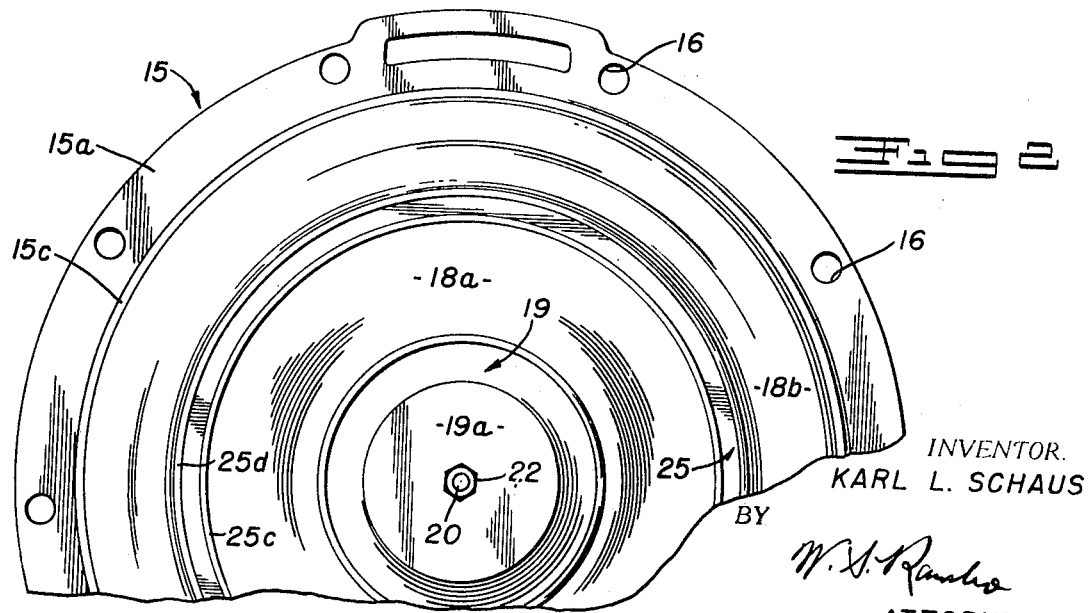
FIG. 2 is an enlarged, fragmentary side elevational view of the diaphragm assembly apart from the gas meter.

With particular reference to FIGS. 2 and 3, it will be seen that the present diaphragm assembly comprises an annular outer mounting rim 15 which is adapted to be clamped and securely fastened between the adjoining faces of the central body portion of the casing 5 and the end cover 6 by the bolts 8 which pass through the openings 16 formed in the rim 15. The rim 15 is preferably made up of a pair of identical, relatively thin, annular sheet metal sections 15a and 15b which are of generally planar configuration except for their outwardly turned and rolled inner circumferential edges 15c. Adhesively secured between the sections 15a and 15b of the mounting rim 15 is the outer, annular, marginal edge portion 17 of a generally dome or bowl-shaped, flexible diaphragm body 18. The diaphragm body 18 is of sheet form and is preferably composed of a molded, gas impervious rubberized fabric or elastomer, such as: Buna N (a butadiene-acrylonitrile copolymer), or Neoprene (a chloroprene polymer).

The diaphragm assembly also includes a centrally positioned center pan 19 composed of a pair of complemental, relatively nesting, dish-shaped sheet metal sections 19a and 19b. The relatively opposed sections 19a and 19b of the center pan are held in clamped engagement with the opposite sides of the center portion of the flexible diaphragm body 18 by means of a screw threaded shank portion 20 of a clevis 21, and a clamping nut 22. As will be seen in FIG. 3, the shank portion 20 of the clevis 21 passes through registering openings formed in the center pan sections 19a and 19b and in the center of the diaphragm body 18, and the nut 22, when tightened on the shank portion 20, serves to tightly clamp the central portion of the diaphragm body between the center pan sections 19a and 19b. The clevis 21 is preferably formed from a relatively lightweight plastic or metal and is pivotally connected by a pin 23 with the terminal eye portion 12a of the connecting rod 12 leading to the lower crank assembly 11 of the meter.

Secured to the intermediate portion of the flexible diaphragm body 18, as by means of a helically wrapped bailing wire or twine 24, is an annular, rigid, stabilizing and tensioning hoop or ring 25. The ring 25 is preferably formed from sheet metal and has a generally right angular cross sectional configuration which includes an axially directed rim portion 25a and a radially inwardly directed web or flange 25b which terminates in a smooth, rolled inner edge 25c. The outer edge of the rim portion 25a is preferably formed with an inwardly turned lip 25d. As will be noted, the ring 25 is disposed in radially outwardly spaced, concentric relation to the center pan 19 and in inwardly spaced relation to the mounting rim 15.

The ring 25 is secured to the intermediate portion of the flexible diaphragm body 18, so that the central area 18a of the diaphragm body is under slightly stretched, resilient tension. This serves to hold the annular area of the diaphragm body which lies between the center pan 19 and the ring 25 in a planar, but yieldable condition. The area of the diaphragm body 18 lying between the ring 25 and the mounting rim 15 defines a flexible bellows portion 18b which has sufficient fullness to permit the diaphragm body and its attached tensioning ring 25 and center pan 19 to move axially back and forth through the mounting rim 15 between its extreme left-hand position shown in full lines in FIG. 3 and its extreme right-hand position as shown by broken lines in FIG. 3.

As will be understood, the reciprocating movement of the diaphragm body is in response to a differential in gas pressures within the respective chambers of the gas meter casing occasioned by the alternate pressurization and venting of the respective chambers by the usual valving mechanism of the gas meter, not shown. This reciprocating movement of the diaphragm assembly is transmitted through the connecting rods 12 and 13 to the lower crank assembly 11 to cause axial rotation of the index drive shaft 14 which controls the operation of the valving mechanism and the indicating or recording mechanism of the gas meter in a manner well understood by those skilled in the art.

The slightly tensioned condition of the central area 18a of the flexible diaphragm body 18 serves not only to hold the center pan portion of the diaphragm assembly in a desired centered position within the ring 25, but also provides a cushioning or "dash pot" action as the diaphragm body reaches its extreme opposite end positions and reverses its direction of movement at the end of each pulse. This cushioning action is occasioned by the ability of the central portion 18a of the diaphragm to resiliently yield slightly under the inertia of the center pan 19 and the clevis 21 and connecting rod 12 when the bellows portion 18b of the diaphragm body reaches the limits of its flexing movement, and thereby contributes to a desired smooth, unabrupt change of direction of movement of the diaphragm and its associated drive linkage. Additionally, the stabilizing and tensioning ring 25, coupled with the molded configuration of the flexible diaphragm body 18 makes possible the elimination of the usual wrinkles, puckers, or "crows feet" which normally are present in prior art diaphragm assemblies particularly in the areas where the flexible diaphragm body is attached to the mounting rim and center pan components of the assembly. This absence of wrinkles, or "crows feet" greatly increases the accuracy of measurement by the gas meter by insuring uniform volumetric displacement upon each stroke or pulse of the diaphragm.

While a single preferred embodiment of this invention has been illustrated and described in detail, it will be understood that various modifications as to details of construction and design may be resorted to without departing from the spirit of the invention or the scope of the following claims.

I claim:

1. In a gas meter diaphragm which includes a generally circular bowl-shaped diaphragm body of flexible, gas impervious sheet material, a substantially rigid, annular mounting rim secured to and supporting the outer marginal edge portion of said body, and a rigid center pan secured to the central portion of said diaphragm body; that improvement which comprises a rigid, annular stabilizer ring of generally right angular cross-sectional configuration secured to said diaphragm body intermediate said mounting rim and said center pan and defining on said diaphragm body an outer flexible bellows portion and a resiliently tensioned, planar central portion, said stabilizer ring including an axially directed rim portion and a generally radially inwardly directed flange portion arranged to form on the intermediate portion of said diaphragm body a smooth, open, right angular bend between the flexible bellows portion and the resiliently tensioned central portion of said diaphragm body and means for clamping said diaphragm body to the axially directed rim portion of said stabilizing ring.

* * * * *